United States Patent
Intoppa (10) Patent No.: US 10,169,889 B2
(45) Date of Patent: Jan. 1, 2019

(54) TECHNIQUES FOR VISUALIZING BIG DATA IN A TWO-DIMENSIONAL CHART

(71) Applicant: Daniel Intoppa, Karlsruhe (DE)

(72) Inventor: Daniel Intoppa, Karlsruhe (DE)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 14/488,634

(22) Filed: Sep. 17, 2014

(65) Prior Publication Data

US 2016/0078653 A1 Mar. 17, 2016

(51) Int. Cl.
*G06T 11/20* (2006.01)
*G06T 11/00* (2006.01)
*G06T 3/40* (2006.01)

(52) U.S. Cl.
CPC .............. *G06T 11/206* (2013.01); *G06T 3/40* (2013.01); *G06T 11/001* (2013.01); *G06T 11/20* (2013.01)

(58) Field of Classification Search
None
See application file for complete search history.

(56) References Cited

U.S. PATENT DOCUMENTS

| | | | | |
|---|---|---|---|---|
| 7,986,331 | B1* | 7/2011 | Meridian | G06F 3/04847 345/619 |
| 2008/0163085 | A1* | 7/2008 | Subbu | G06F 9/4443 715/763 |
| 2011/0065506 | A1* | 3/2011 | Sugden | G06T 15/04 463/32 |
| 2013/0069951 | A1* | 3/2013 | Dembo | G06T 11/206 345/440.2 |
| 2013/0093757 | A1* | 4/2013 | Cornell | G06T 17/05 345/419 |
| 2013/0304725 | A1* | 11/2013 | Nee | G06F 17/30554 707/722 |
| 2014/0218753 | A1* | 8/2014 | Murasawa | H04N 1/40068 358/1.2 |
| 2015/0363641 | A1* | 12/2015 | Navulur | G06K 9/00476 382/113 |

OTHER PUBLICATIONS

Sanjay Matange, Scatter plot matrix with a twist—Graphically Speaking, 2013, SAS Institute Inc.*

(Continued)

*Primary Examiner* — Said Broome
*Assistant Examiner* — YuJang Tswei
(74) *Attorney, Agent, or Firm* — Fountainheadlaw Group P.C.

(57) ABSTRACT

A technique is described for analyzing a dataset that includes many dataset objects by generating a hybrid chart. The hybrid chart is a two-dimensional chart that is divided up into multiple segments. Some segments are configured to present a color from a color scale that is used to represent the number of dataset objects that lie within the segment. Other segments are configured to present dataset objects within the segment by plotting the dataset objects. Depending on the number of dataset objects within the segment, one of these two approaches can be used. The chart offers interactivity like zooming and selecting a range of datasets. Furthermore the chart starts by offering a coarse overview while generating views with increasing granularity and more details over time. During this process the chart remains completely interactive.

19 Claims, 7 Drawing Sheets

(56) References Cited

OTHER PUBLICATIONS

Rene Brun, class THistPainter: public TVirtualHistPainter, 2000, Rene Brun and Fons Rademakers.*
Mai nella stessa forma, "Hexagonal Binning —new method of visualization for data analysis _ Meccanismo Complesso", Mar. 5, 2004.*
RSS, SAS and R_ Example 10.3_ Enhanced scatterplot with marginal histograms, Sep. 24, 2012.*
Rapid-I, "Rapidminer: Advanced Charts", 2012, Rapid-I GmbH.*

* cited by examiner

TECHNIQUES FOR VISUALIZING BIG DATA IN A TWO-DIMENSIONAL CHART

BACKGROUND

Traditional approaches to display datasets in a two-dimensional chart are not well suited for large sets of data. A first approach is called a scatterplot. A scatterplot is a two-dimensional chart that displays each object within the dataset in the two-dimensional chart where the horizontal axis represents one variable of the object and the vertical axis represents a second variable of the object. Each object would be plotted in the scatterplot according to the values of the variables. Since each object within the dataset is represented by a point in the scatterplot, the scatterplot can present thousands of points if the dataset is quite large. These large datasets can be computationally expensive and also clutter the chart making it difficult to extract meaningful information.

A second approach is called a histogram. A histogram is a two-dimensional chart that displays information about the density of a dataset by grouping objects within the dataset into segments. Each segment can be displayed using a color scale to represent the density of the segment (e.g., number of objects within the segment). Through grouping, large datasets can appear less cluttered in the chart since many objects are being clustered together and displayed. However, the inherent nature of the groupings in a histogram prevents critical analysis since objects within the dataset cannot be individually examined.

SUMMARY

In one embodiment, a computer-implemented method receives a dataset containing a plurality of dataset objects, each dataset object including a first variable and a second variable. The method then determines boundaries of the dataset with respect to the first variable and the second variable. The method then generates a first template for a two-dimensional chart according to the boundaries of the dataset, the first template having a plurality of segments that each represent an area within the boundaries, wherein the first variable is associated with a first dimension of the two-dimensional chart and the second variable is associated with a second dimension of the two-dimensional chart. Lastly, the method generates a two-dimensional chart based on the dataset. This can involve, for each segment of the first template, identifying, by the processor, a plurality of dataset objects from the dataset located within a segment of the first template, shading, by the processor, the segment a color from a color scale when a total count of the plurality of dataset objects is greater than a predefined threshold, and plotting, by the processor, the plurality of dataset objects when the total count of the plurality of dataset objects is less than or equal to the predefined threshold.

In one example, the plurality of segments are the same or substantially the same size, the size being determined by an interval count specifying a desired number of segments.

In another example, shading the segment the color from the color scale comprises shading the segment as the color on a histogram layer of the two-dimensional chart.

In another example, the color is determined by the number of dataset objects.

In another example, plotting the plurality of dataset objects comprises plotting the dataset objects on a scatterplot layer of the two-dimensional chart. The scatterplot layer can be configured to allow for user interaction with the plotted dataset objects.

In another example, the method can further include detecting user input representative of zooming into a portion of the two-dimensional chart, generating a second template for the two-dimensional chart according to the portion, wherein the plurality of segments have been resized according to the boundaries of zoomed portion, and applying, by the processor, the dataset to the second template to generate a refined view of the two dimensional chart.

In another embodiment, a non-transitory computer-readable storage medium receives a dataset containing a plurality of dataset objects, each dataset object including a first variable and a second variable, determines boundaries of the dataset with respect to the first variable and the second variable, generates a first template for a two-dimensional chart according to the boundaries of the dataset, the first template having a plurality of segments that each represent an area within the boundaries, wherein the first variable is associated with a first dimension of the two-dimensional chart and the second variable is associated with a second dimension of the two-dimensional chart, and applies the dataset to the first template to generate the two-dimensional chart, wherein applying the dataset comprises for each segment of the first template: identifying a plurality of dataset objects from the dataset located within a segment of the first template, shading the segment a color from a color scale when a total count of the plurality of dataset objects is greater than a predefined threshold, and plotting the plurality of dataset objects when the total count of the plurality of dataset objects is less than or equal to the predefined threshold.

In another embodiment, a computer implemented system comprises one or more computer processors and a non-transitory computer-readable storage medium. The non-transitory computer-readable storage medium comprises instructions, that when executed, control the one or more computer processors to be configured for generating a dataset containing a plurality of dataset objects, each dataset object including a first variable and a second variable, determining boundaries of the dataset with respect to the first variable and the second variable, generates a first template for a two-dimensional chart according to the boundaries of the dataset, the first template having a plurality of segments that each represent an area within the boundaries, wherein the first variable is associated with a first dimension of the two-dimensional chart and the second variable is associated with a second dimension of the two-dimensional chart, and applying the dataset to the first template to generate the two-dimensional chart, wherein applying the dataset comprises for each segment of the first template: identifying a plurality of dataset objects from the dataset located within a segment of the first template, shading the segment a color from a color scale when a total count of the plurality of dataset objects is greater than a predefined threshold, and plotting the plurality of dataset objects when the total count of the plurality of dataset objects is less than or equal to the predefined threshold.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments herein describe a technique for generating a hybrid chart that allows users to extract meaningful information from large datasets (e.g., big data). The hybrid chart is a Cartesian chart that has been divided into multiple segments. Some segments present analysis similar to a scatterplot chart while other segments present analysis similar to histogram chart. In some embodiments, each segment can dynamically change from one chart type to the other. The hybrid chart has many advantages including the ability to present large datasets (e.g., big data) without requiring extensive processing power in the backend, memory in the frontend, or network bandwidth between the frontend and backend. Furthermore, the hybrid chart is capable of examining specific objects within the dataset in detail. Lastly, the hybrid chart is configured to allow a user to interact with the chart in real time.

Figure 1:
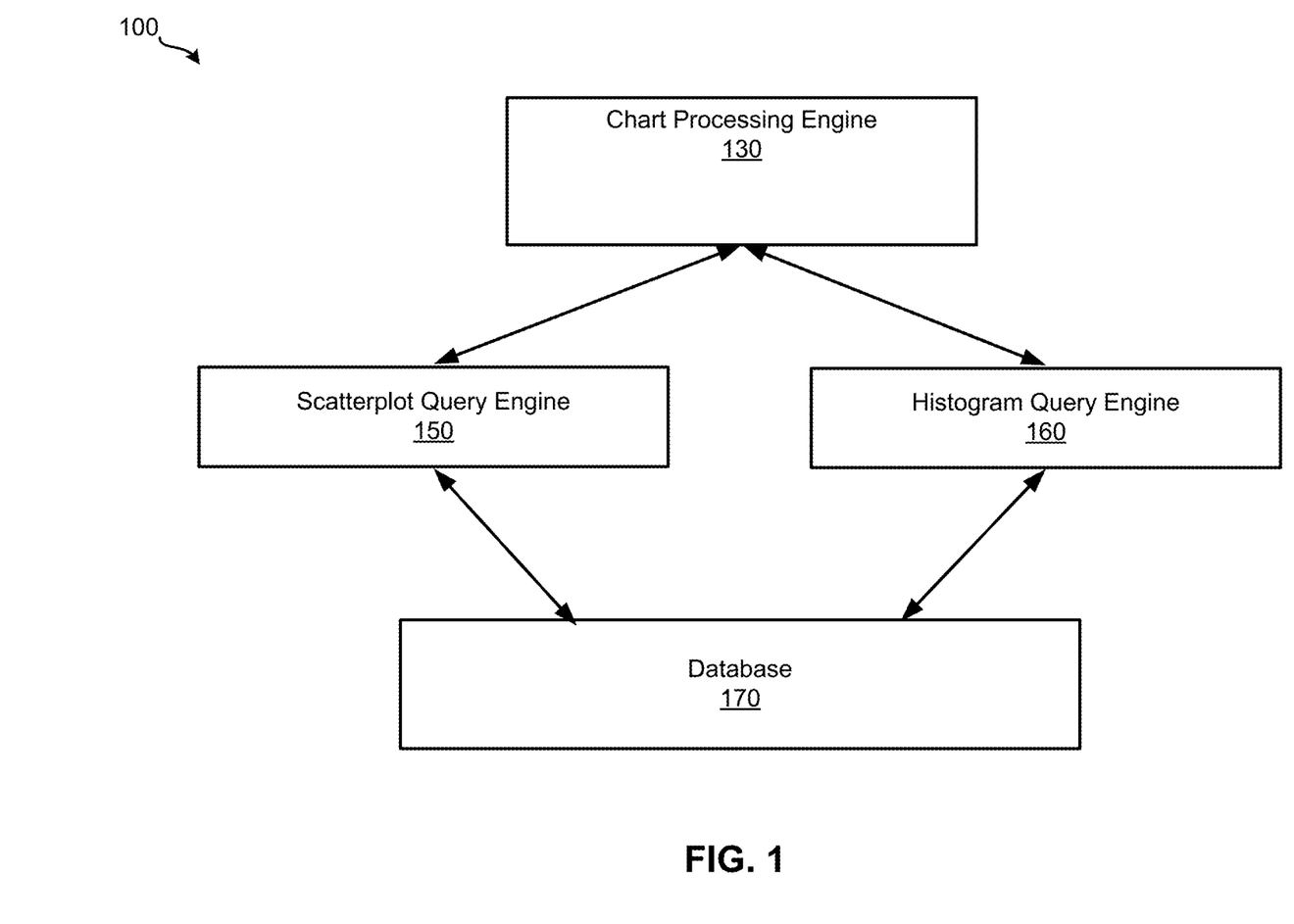
FIG. 1 illustrates a system according to one embodiment.

FIG. 1 illustrates system 100 according to one embodiment. System 100 includes chart processing engine 130, scatterplot query engine 150, histogram query engine 160, and database 170. Chart processing engine 130 is configured to generate a hybrid chart. The hybrid chart is a two-dimensional chart that analyzes a dataset stored in database 170. The dataset can include many objects where each object contains many variables. The hybrid chart provides analysis on the dataset with respect to two variables; a first variable that is plotted along the x-axis and a second variable that is plotted along the y-axis.

In one embodiment, chart processing engine 130 resides on the client side. As a result, the client expends memory and computing power to generate the hybrid chart. In another embodiment, chart processing engine 130 resides on the server side. The server receives a request from a client and processes the request to generate the hybrid chart. The server then transmits the hybrid chart to the client where the hybrid chart can be presented to a user. This can minimize the use of the resources on the client. This can be particularly important with lightweight clients (clients who are have minimal processing power and memory to reduce size or cost). If the client wishes to interact with the hybrid chart, the client can transmit instructions to the server. The server can process the instructions to update the hybrid chart and transmit the updated hybrid chart over to the client. Alternatively, the server can generate updates to the hybrid chart and transmit the updates to the client. The client in turn incorporates the updates to the local copy of the hybrid chart.

Chart processing engine 130 (which can be located on the client or the server, depending on implementation details) is configured to generate the hybrid chart. The hybrid chart can be generated in response to user input or can be generated at a predefined interval. Chart processing engine 130 is also configured to process user input to update an existing hybrid chart. For example, user requests to zoom into an area of an existing hybrid chart or select an area of an existing hybrid chart can be processed by chart processing engine 130.

Chart processing engine 130 communicates with scatterplot query engine 150 and histogram query engine 160 during generation of the hybrid chart. While generating the hybrid chart, chart processing engine 130 can transmit data queries to scatterplot query engine 150 and/or histogram query engine 160 to retrieve content to generate the hybrid chart. Each data query can be to search the dataset for content that lies within a segment of the hybrid chart. A segment defines an area of the hybrid chart. For instance, a segment of a hybrid chart (if the hybrid chart is created in Cartesian coordinates) can be defined as [0,0] to [5,5] to specify an area of the hybrid chart with a bottom left corner at [0,0] and a top right corner at [5,5]. A dataset object lies within the segment of the hybrid chart if the variables of the dataset object which coincide with the x-dimension and y-dimension of the hybrid chart are within the boundaries of the segment. As such, plotting the dataset object within the hybrid chart would result in the dataset object appearing within the segment. Chart processing engine 130 can adjust the segment size depending on the desired level of detail within the hybrid chart. Typically, smaller segment sizes coincide with a higher level of detail.

Scatterplot query engine 150 is configured to return a set of results from the dataset which lie within the boundaries defined by the queried segment. In one embodiment, the set of results can be the dataset objects themselves. In another embodiment, a version of the dataset objects can be returned. For example, a compact version of a dataset object can include a subset of the properties that belong to the dataset object. For instance, a compact version of a dataset object can include a unique identifier for the dataset object, the value for the variable charted in the x-dimension, and the value for the variable charted in the y-dimension. This allows the dataset object to be represented as a point in the hybrid chart. Other properties and values of the dataset object can be retrieved from database 170 using subsequent requests.

Histogram query engine 160 is configured to return a count that specifies the number of dataset objects which lie within the segment. For example if there are 10 dataset objects which lie within the segment, then the value of 10 would be returned for the count. In one example, the count can also be accompanied with a unique identifier that identifies the segment that corresponds with the count. For instance, the unique identifier can be a one dimensional array containing two values where the first value of the vector represents the segment number in the x-dimension and the second value represents the segment number in the y-dimension. This allows the segment to be uniquely identified in the hybrid chart based on its position relative to other segments in the hybrid chart.

Figure 2:
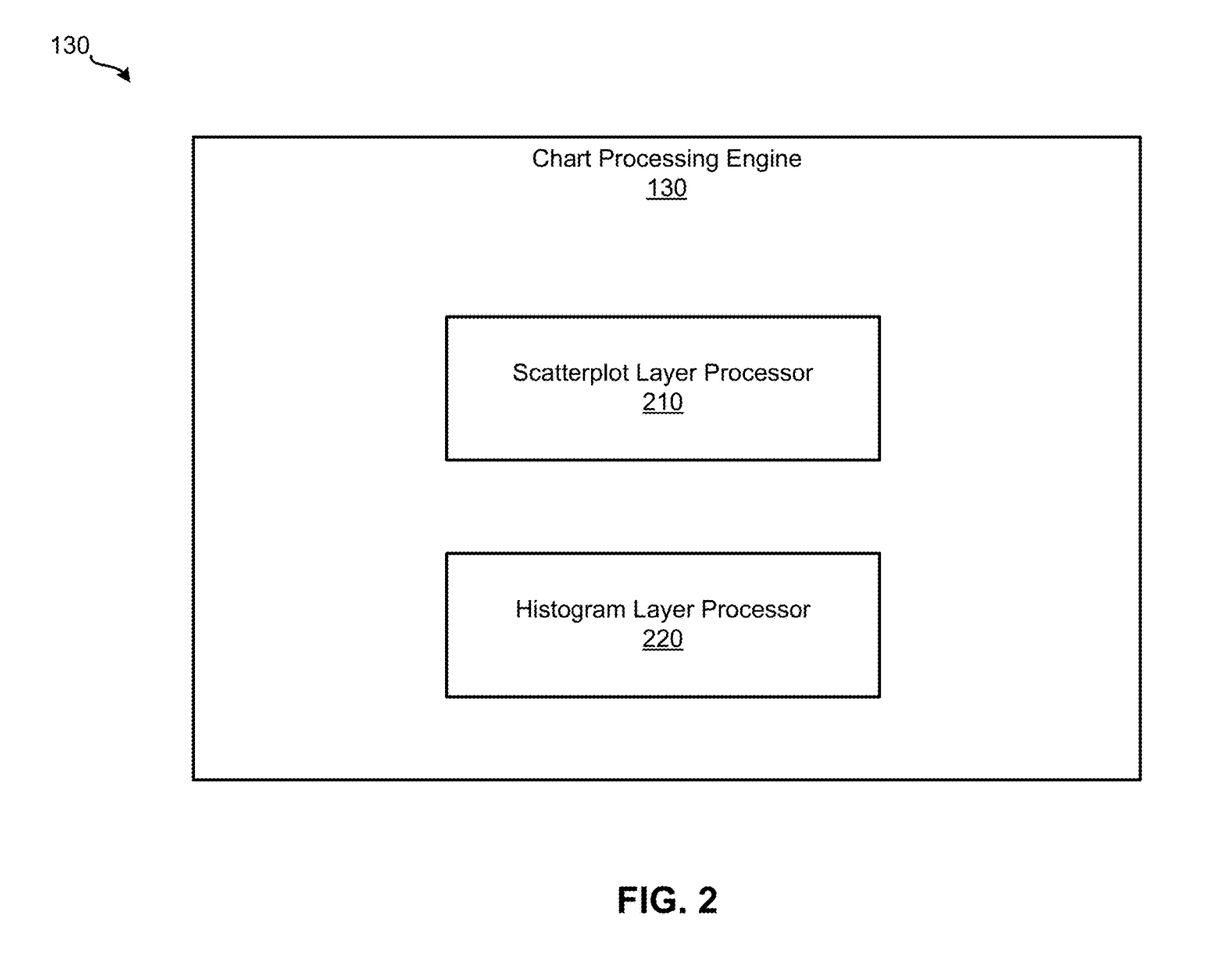
FIG. 2 illustrates a chart processing engine according to one embodiment.

FIG. 2 illustrates chart processing engine 130 according to one embodiment. Chart processing engine 130 includes scatterplot layer processor 210 and histogram layer processor 220. The two processing engines can work together to generate the hybrid chart. The hybrid chart can include two layers—a scatterplot layer and a histogram layer. The scatterplot layer can present one or more segments of the hybrid chart in a scatterplot format (e.g., where each database object within the segment is presented as a dot in the scatterplot layer) while the histogram layer can present one or more segments of the hybrid chart in a histogram format (e.g., where the appearance of the segment in the histogram layer is dependent on the count (or density) associated with the segment). Scatterplot layer processor 210 is configured to generate the scatterplot layer while histogram layer processor 220 is configured to generate the histogram layer. Once both the scatterplot layer and the histogram layer are generated, chart processing engine 130 can select segments from the scatterplot layer and from the histogram layer to form the hybrid chart. The manner in which chart processing engine 130 utilizes scatterplot layer processor 210 and histogram layer processor 230 can depend on implementation details.

In one embodiment, chart processing engine 130 can divide the hybrid chart into segments and assign segments of the hybrid chart to be processed by either scatterplot layer processor 210 or histogram layer processor 220. Chart processing engine 130 can categorize each segment of the hybrid chart as a histogram segment or a scatterplot segment. Scatterplot layer processor 210 can be configured to process the scatterplot segments to generate the scatterplot layer while histogram layer processor 220 can be configured to process the histogram segments to generate the histogram layer. Once both layers have been generated, chart processing engine 130 can combine or overlay the two layers to form the hybrid chart. Since each segment is assigned to be processed by one of scatterplot layer processor 210 or histogram layer processor 220, overlaying the two layers will not result in a segment presenting data in both the histogram layer and the scatterplot layer. Alternatively, scatterplot layer processor 210 and histogram layer processor 220 can process their respective segments and return the results directly to the hybrid chart. Once all segments have been processed, the hybrid chart is completed.

In another embodiment, chart processing engine 130 can transmit a request to histogram layer processor 220 to generate a histogram layer of the hybrid chart. Chart processing engine 130 can provide input parameters such as the minimal boundary of the x-dimension, the maximal boundary of the x-dimension, the minimal boundary of the y-dimension, the maximal boundary of the y-dimension, and an interval count that specifies the desired number of segments in each dimension. In some examples, a unique interval count can be assigned to each dimension. Some of the input parameters can be required such as the interval count while other input parameters can be optional such as the minimal and maximal boundaries. The minimal and maximal boundaries can alternatively be determined by analyzing the dataset. Histogram layer processor 220 can process the request by first dividing the histogram layer into segments that are sized according to the provided input parameters in the request. For example, the boundaries and the interval count (or counts) can be utilized to divide the histogram layer into equally sized segments. Histogram layer processor 220 can then analyze each segment to generate the histogram layer.

Once the histogram layer has been generated, chart processing engine 130 can evaluate the histogram layer to determine which segments should be assigned to the scatterplot layer. In one example, this determination can be made based on the number of dataset objects within the segment. The segments that contain less than a predefined number of dataset objects can be assigned as scatterplot segments. Chart processing engine 130 can continue by requesting scatterplot layer processor 210 to generate a scatterplot layer of the hybrid chart. The scatterplot layer can present content for the scatterplot segments. Once scatterplot layer processor 210 has generated the scatterplot layer, chart processing engine 130 can combine the scatterplot layer with the histogram layer to create the hybrid chart. Segments that have been reassigned as scatterplot segments can appear empty in the histogram layer.

Scatterplot layer processor 210 can process a scatterplot segment by receiving input parameters of the minimal boundary in the x-dimension, maximal boundary in the x-dimension, minimal boundary in the y-dimension, and maximal boundary in the y-dimension. The boundaries define the area of the segment. If the input parameters are provided, scatterplot layer processor 210 can submit a query to scatterplot query engine 150 to retrieve dataset objects that lie within the provided boundaries. If the input parameters are not provided, scatterplot layer processor 210 can submit a query to scatterplot query engine 150 to retrieve all dataset objects within the dataset. Scatterplot query engine 150 can return the dataset objects or a compact version of the dataset objects to scatterplot layer processor 210. Scatterplot layer processor 210 can process the received dataset objects by plotting them in the scatterplot layer. Each dataset object can be plotted as a point in the scatterplot layer. Scatterplot layer processor 210 can repeat this process for all the scatterplot segments in the hybrid chart.

In one embodiment, the scatterplot layer can be configured to allow for user interaction. Thus, each point in the scatterplot layer can be selectable. When selected, scatterplot layer processor 210 can retrieve additional information on the dataset object and present the additional information. In one example, the additional information can be retrieved from a local copy of the dataset object. In another example, the additional information can be retrieved from database 170.

In one embodiment, histogram layer processor 220 can process a histogram segment by submitting a query to histogram query engine 160 for a count of the dataset objects that lie within the boundaries of the histogram segment. Once histogram query engine 160 returns a count, histogram layer processor 220 can select an appearance for the segment based on the count and apply the appearance to the segment in the histogram layer of the hybrid chart. For example, a count within one range can be associated with a first color or color scale while a count within another range can be associated with a second color or color scale. This allows a user to quickly infer which segments of the hybrid chart are "hot" (e.g., have many dataset objects) and which segments of the hybrid chart are "cold" (e.g., have few dataset objects).

In another embodiment, histogram layer processor 220 can process a histogram segment by submitting a query to histogram query engine 160 for the density of the histogram segment. The density of the histogram segment is the number of dataset objects that lie in within the boundaries of the histogram segment divided by the size of the histogram segment. By calculating the density, segments of different sizes can be accurately compared against one another since by default, larger segments should contain more objects than smaller segments. Segments within a first density range can be presented in a first color or color scale while segments within a second density range can be presented in a second color or color scale.

In yet another embodiment, histogram layer processor 220 can generate the histogram layer in response to receiving input parameters such as the minimal boundary on the x-dimension, maximal boundary on the x-dimension, the minimal boundary on the y-dimension, the maximal boundary on the y-dimension, and the desired interval count. The interval count can specify the number of desired segments in the x-dimension, y-dimension, or both dimensions. In some examples, different interval counts can be applied to each dimension. Histogram layer processor 220 can determine the area of the histogram layer based on the boundaries provided and determine the segment sizes based on the area of the histogram layer and the desired interval count. For example if the area of the histogram layer is defined by a lower left corner of [0,0] and an upper right corner of [100, 100] (thus having an area of 100×100) and the desired interval count is two, then the (1,1) segment would have an area defined by a lower left corner of [0,0] and an upper right corner of [50, 50], the (2,1) segment would have an area defined by a lower left corner of [50,0] and an upper right corner of [100, 50], the (1,2) segment would have an area defined by a lower left corner of [0,50] and an upper right corner of [50, 100], and the (2,2) segment would have an area defined by a lower left corner of [50,50] and an upper right corner of [100, 100]. Histogram layer processor 220 can submit queries to histogram query engine 160 for each defined segment and retrieve a count (or density) of dataset objects that lie within the segment. The count (or density) of the segment can then be presented in the histogram layer as a color or color scale.

In one embodiment, chart processing engine 130 can assign a segment as a histogram segment or a scatterplot segment based on the number of dataset objects that lie within the segment. For example, chart processing engine 130 can assign a segment as a histogram segment if the segment contains more than a predefined number of dataset objects (e.g., 5 dataset objects) and can assign the segment as a scatterplot segment if the segment contains less than or equal to the predefined number of dataset objects (e.g., 5 or fewer dataset objects). To discover the number of objects in each segment, histogram layer processor 220 can first analyze the dataset to generate the histogram layer. Segments in the histogram layer that contain fewer than the predefined number of dataset objects can be reanalyzed by scatterplot layer processor 210 and presented as part of the scatterplot layer.

In some embodiments, chart processing engine 130 can dynamically reassign a segment of the hybrid chart from one processor to the other. This can occur due to a change in the count of the segment, which can be due to a change in the size of the segment (thus a change in the number of dataset objects that lie within the segment) or the introduction of new dataset objects to the dataset. In one example, chart processing engine 130 can reassign a segment to be processed by scatterplot layer processor 210 instead of histogram layer processor 220 when the count of the segment is equal to or falls below a predefined threshold of 5 dataset objects. Similarly, chart processing engine 130 can reassign a segment to be processed by histogram layer processor 220 instead of scatterplot layer processor 210 when the count of the segment rises above the predefined threshold of 5 dataset objects.

In some embodiments, chart processing engine 130 can be configured to initially generate a coarse view of the hybrid chart upon receiving a user request for the hybrid chart. Chart processing engine 130 can generate a coarse view of the hybrid chart by generating a chart based on a large segment size. The large segment size can be specified by setting the initial segment size to be a large number or alternatively by selecting a small number of segments to exist in the hybrid chart. For example if it is specified that there be only two segments in each dimension, chart processing engine 130 will automatically set the segment size to be half of the difference between the minimal and maximal values for both x and y dimensions. By using a large segment size, the hybrid chart will have fewer segments which translates to less data that needs to be retrieved and processed by chart processing engine 130. In a client-server model, less data is also transmitted from the server to the client to present the hybrid chart to the user. Advantages of the coarse view can include a reduction in the memory usage due to a reduction in the data retrieved and a reduction in the processing power required to generate the hybrid chart due to a reduction of the data to be processed. This can result in an improvement in the processing time needed to generate the hybrid chart, thus allowing the user request for a hybrid chart to be quickly fulfilled. In a client server model, this can also result in a reduction in the data transmitted between the client and server. After presenting the coarse view, chart processing engine 130 can continue loading additional content from the dataset based on a reduced segment size. Additional requests can be made to database 170 for additional content based on a reduced segment size. Chart processing engine 130 can process the additional content to generate a refined view of the hybrid chart. This process can be repeated until the desired level of refinement is reached. The desired level of refinement can be set by setting the minimum block size of the segment. Once the segment size has reached the minimum block size, chart processing engine will no longer continue loading additional content from the dataset. By using this technique, a coarse view of the hybrid chart can be initially presented to the user and refined views of the hybrid chart can be subsequently presented to the user over time. Advantages of this include the ability to generate an overview while the data processing for generating increasingly more refined views is ongoing, thus using the processing time to display meaningful information and allowing for additional interaction in the meantime.

Figure 3A:
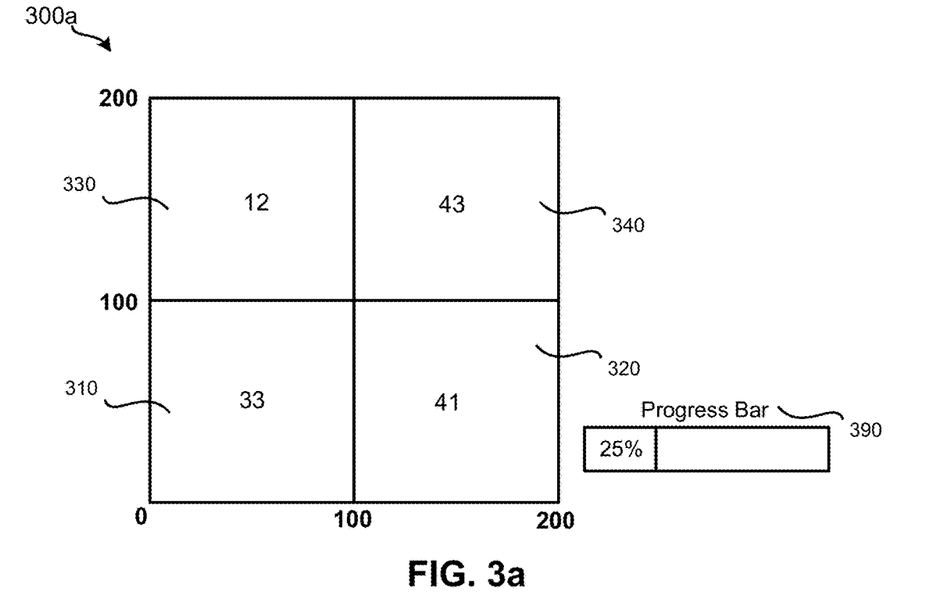
FIG. 3a illustrates a coarse view of the histogram layer according to one embodiment.

FIG. 3a illustrates a coarse view of the histogram layer according to one embodiment. Initially, chart processing engine 130 can set an interval count that specifies the number of segments to divide the hybrid chart. In one example, chart processing engine 130 can apply the same interval count to both the x-dimension and y-dimension. In other examples, chart processing engine 130 can have an individual interval count be set for the x-dimension and the y-dimension. Chart processing engine 130 can pass the interval count to histogram layer processor 220 which in turn generates histogram layer 300a shown in FIG. 3a. Here, the interval count is set to two so histogram layer processor 220 can divide the area of the histogram layer 300a into a 2×2 matrix of segments. The segments are segment 310, 320, 330, and 340. The unique identifier for each matrix can be [1,1] for segment 310, [1,2] for segment 320, [2,1] for segment 330, and [2,2] for segment 340. Histogram layer processor 220 retrieves the number of dataset objects within each segment from database 170. Here, segment 310 includes 33 dataset objects, segment 320 includes 41 dataset objects, segment 330 includes 12 dataset objects, and segment 340 includes 43 dataset objects. Progress bar 390 presents an indicator of the level of detail that is being presented in histogram layer 300*a*. As shown here, each segment can display a number in the middle signifying the number of dataset objects that lie within the segment. In other examples, a color or color scale can be applied to each segment based on the number of dataset objects. Since each segment contains more than the predefined threshold of dataset objects (which is set to 5), the scatterplot layer processor 210 is not called and thus the scatterplot layer is empty. As a result, the hybrid chart is simply histogram layer 300*a*.

Figure 3B:
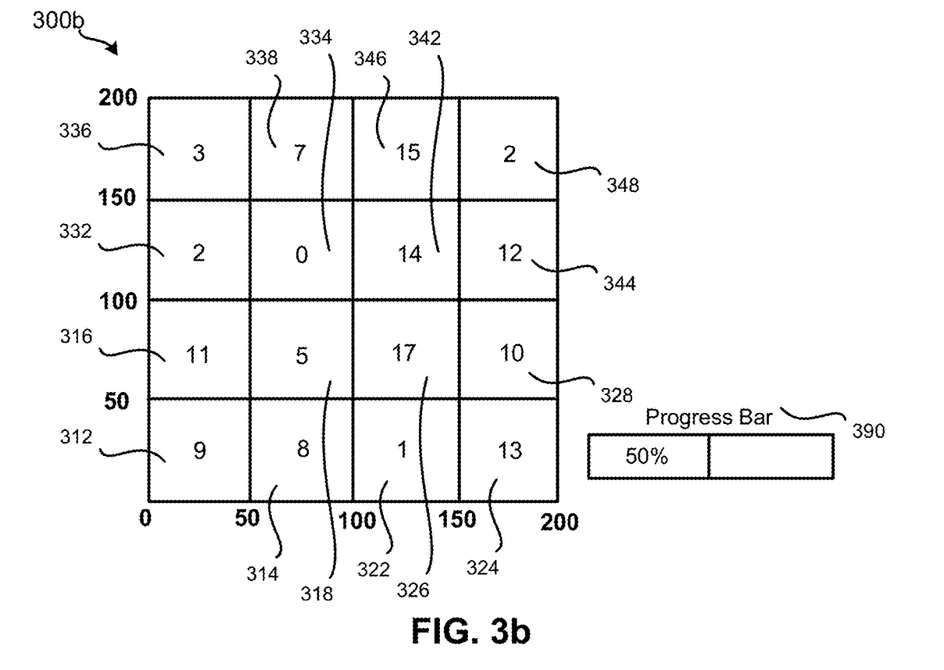
FIG. 3b illustrates a refined view of the histogram layer according to one embodiment.

FIG. 3*b* illustrates a refined view of the histogram layer according to one embodiment. While the coarse view is being presented, the refined view can be generated in the background. As shown here, chart processing engine 130 has doubled the interval count from two to four to generate a refined view of the histogram layer. As a result, histogram layer processor 220 divides the area of histogram layer 300*a* into a 4×4 matrix of segments. The segments that replaced segment 310 of FIG. 3*a* are segments 312, 314, 316, and 318. Similarly, segments 322, 324, 326, and 328 replaced segment 320, segments 332, 334, 336, and 338 replaced segment 330, and segments 342, 344, 346, and 348 replaced segment 340. Histogram layer processor 220 can retrieve the number of dataset objects within each segment from database 170. As shown, segment 310 originally contained 33 dataset objects. Similarly, the new segments that make up segment 310 also contain 33 dataset objects (segment 312 contains 9, segment 314 contains 8, segments 316 contains 11, and segments 318 contains 5). The segments can be presented with a number in the middle representing the number of dataset objects within the segment or alternatively using a color or color scale that is dependent on the number of dataset objects within the segment. Progress bar 390 indicates that the chart is 50% of the desired resolution. After two more refined views, the hybrid chart will be at the desired resolution and the progress bar 390 will indicate that the chart is 100% of the desired resolution. Thus, the status of progress bar is dependent on the desired resolution (which can be specified by a minimum block size for the segment) and the current resolution (which is dependent on the current size of the segment).

Figure 3C:
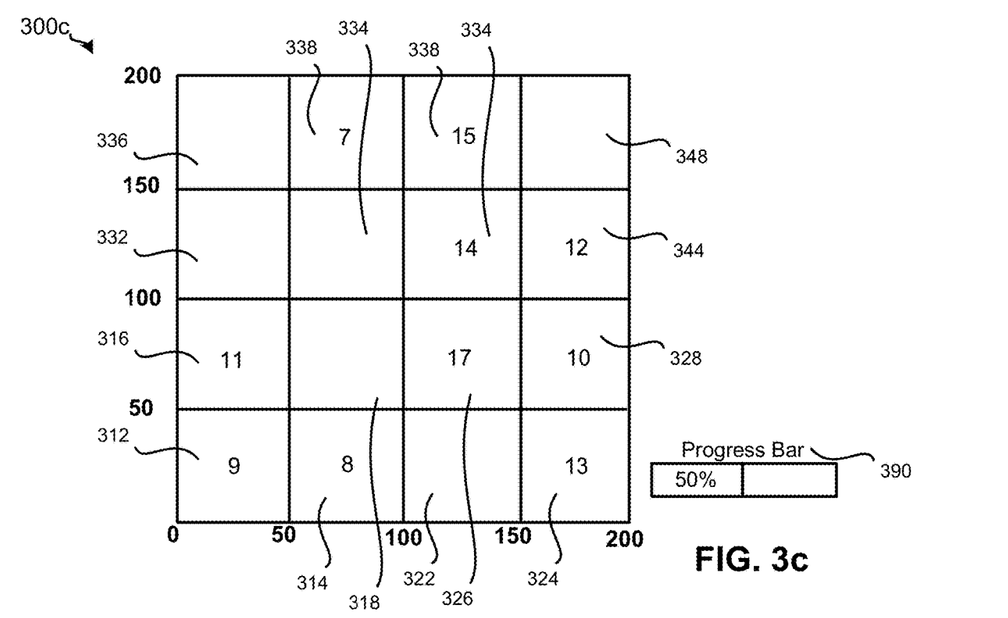
FIG. 3c illustrates a histogram layer after clearing out the scatterplot segments according to one embodiment.

As shown here, some segments contain less dataset objects than the predefined threshold (e.g., 5 dataset objects). As a result, chart processing engine 130 can assign segments containing fewer than the predefined threshold of dataset objects as scatterplot segments. These scatterplot segments can be processed by scatterplot layer processor 210. In this example, segments 318, 322, 334, 336, and 348 contain fewer than the predefined threshold of dataset objects. As a result, chart processing engine 130 can assign segments 318, 322, 334, 336, and 348 to be processed by scatterplot layer processor 210. Histogram layer processor 220 can clear out the segments which have been assigned as scatterplot segments from the histogram layer. FIG. 3*c* illustrates a histogram layer after clearing out the scatterplot segments according to one embodiment. As shown, segments 318, 322, 334, 336, and 348 have been cleared out.

Figure 3D:
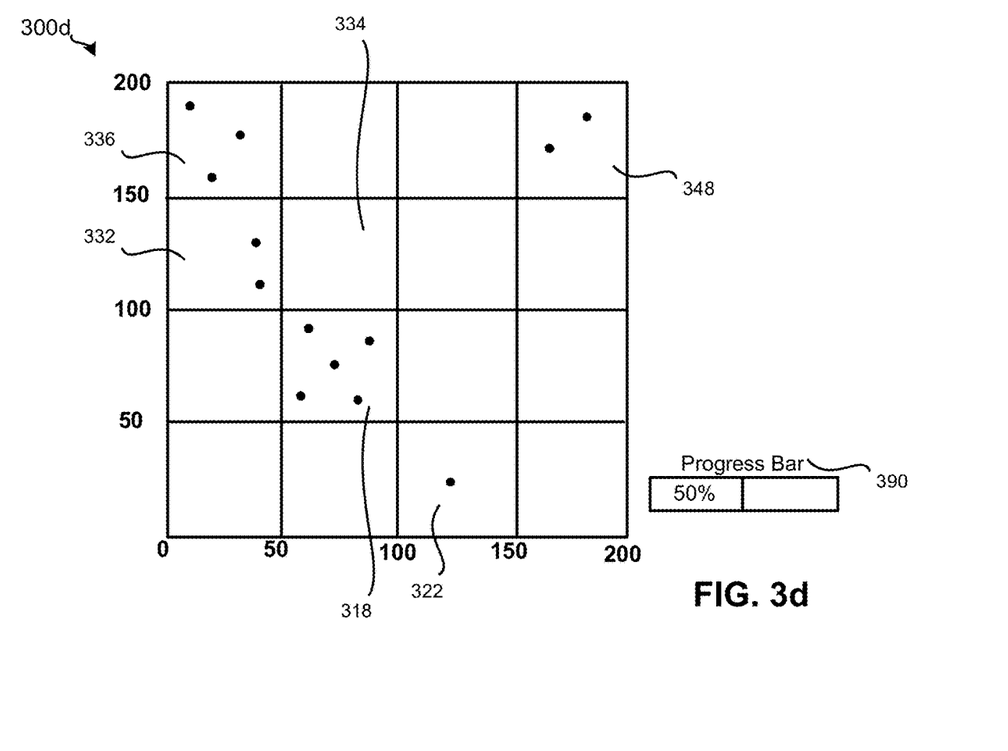
FIG. 3d illustrates a scatterplot layer according to one embodiment.

FIG. 3*d* illustrates a scatterplot layer according to one embodiment. Scatterplot layer 300*d* can be generated by scatterplot layer processor 210. Scatterplot layer processor 210 can process each segment that was assigned to the scatterplot layer during processing of the histogram layer. For each scatterplot segment, scatterplot layer processor 210 can query scatterplot query engine 150 for dataset objects that lie within the scatterplot segment. The query can include the boundaries of the segment. For example, the query for segment 318 can specify that the bottom left hand corner of segment 318 is [50, 50] and the upper right hand corner of segment 318 is [100, 100]. Scatterplot query engine 150 can return metadata on dataset objects that lies within the scatterplot segment. In one embodiment, scatterplot query engine 150 can return, for each dataset object, a unique identifier of the dataset object, a first value for the variable associated with the x-dimension, and a second value for the variable associated with the y-dimension. In other embodiments, other metadata of the dataset object can also be returned by scatterplot query engine 150. Scatterplot layer processor 210 can plot the received dataset objects on the scatterplot layer. Here, scatterplot layer processor 210 has received five dataset objects in segment 318 and has plotted all given dataset objects in the scatterplot layer. Similarly, one dataset object has been plotted in segment 322, two dataset objects have been plotted in 332, zero dataset objects have been plotted in 334 (since the query returned zero dataset objects), three dataset objects have been returned for segment 336, and two dataset objects have been returned for segment 348. After the dataset objects have been plotted in the scatterplot layer, chart processing engine 130 can overlap the scatterplot layer with the histogram layer to generate the hybrid chart. The hybrid chart will include some segments which use dots to represent dataset objects and other segments which use a color or color scale to represent a set of dataset objects.

Figure 4:
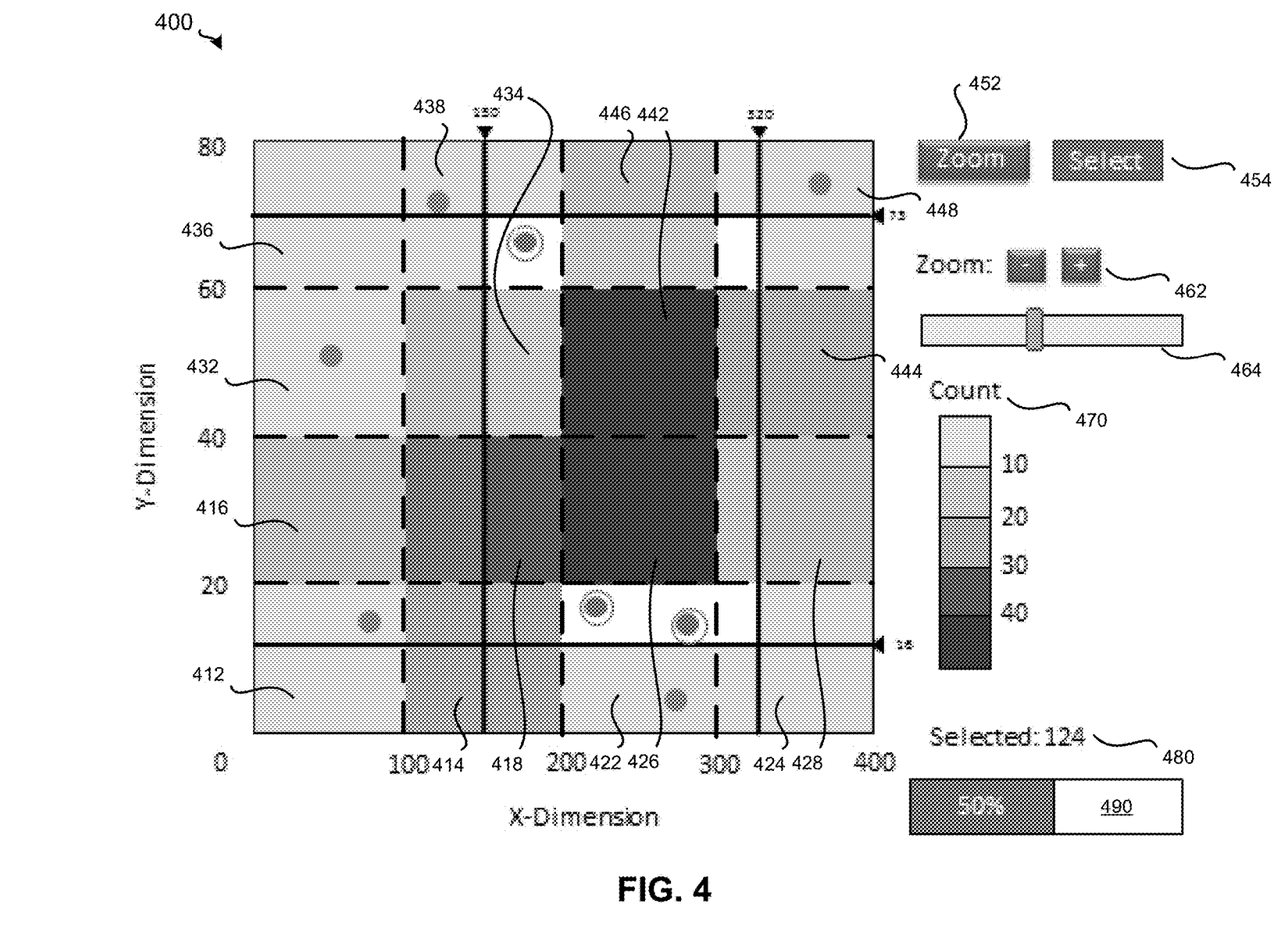
FIG. 4 illustrates an example of selecting a portion of the hybrid chart according to one embodiment.

In some embodiments, a user can interact with the hybrid chart. Interacting with the hybrid chart can include selecting dataset objects within scatterplot segments of the hybrid chart, zooming into an area of the hybrid chart, or selecting an area of interest in the hybrid chart. FIG. 4 illustrates an example of selecting a portion of the hybrid chart according to one embodiment. As shown, hybrid chart 400 includes segments 412, 414, 416, 418, 422, 424, 426, 428, 432, 434, 436, 438, 442, 444, 446, and 448. Segments 412, 422, 432, 438, and 448 are part of the scatterplot layer and thus present dataset objects as dots in the hybrid chart. The remaining segments are part of the histogram layer and thus present a color scale that is dependent on the number of dataset objects that lie within the segment. Scale 470 can be used to determine the meaning of different color scales. For example, the darkest color scale means that the segment contains more than 40 dataset objects while the lightest color scale means that the segment contains less than 10 dataset objects. Hybrid chart 400 is presented with additional functionality. Zoom icon 452, when selected, allows a user to zoom into a selected area of the hybrid chart. In one embodiment, chart processing engine 130 can set the minimal and maximal boundaries of the histogram layer based on the selected area and set reset the interval count so that a new coarse hybrid chart is generated for the selected area. Additional refined hybrid charts can follow the coarse hybrid chart. Icons 462, when selected, can allow the user to zoom into an area of the hybrid chart. Alternatively, zoom bar 464 can be utilized to quickly zoom in and out of the hybrid chart. Zooming can also be accomplished by mouse wheel or two finger touch gesture.

Hybrid chart 400 further includes select icon 454. Select icon 454, when selected, allows a user to select an area of the hybrid chart to perform analysis on the area of the hybrid chart. Here, user input has been received that represents a selection of an area of hybrid chart 400. The user input can be mouse clicks, a mouse click and drag event, two touch and drag event on a touch display, or a two finger touch event on the touch display. The selected area has a lower left hand corner of [150, 16] and an upper right hand corner of [320, 75]. The selected area is illustrated by the solid black lines in hybrid chart 400. Chart processing engine 130 can respond to the selection by providing a list of actions which can be performed on the selected area. The actions can include provide a count for the dataset objects within the area, provide a density of the dataset objects within the area, and provide an average value for the dataset objects within the area. Based on the selected action, chart processing engine 130 can transmit a query to database 170 and present the results of the query to the user. Here, chart processing engine 130 queries database 170 for a count on the number of dataset objects within the selected area and is returned a value of 124. The value 124 is presented as icon 480 in hybrid chart 400.

Figure 5:
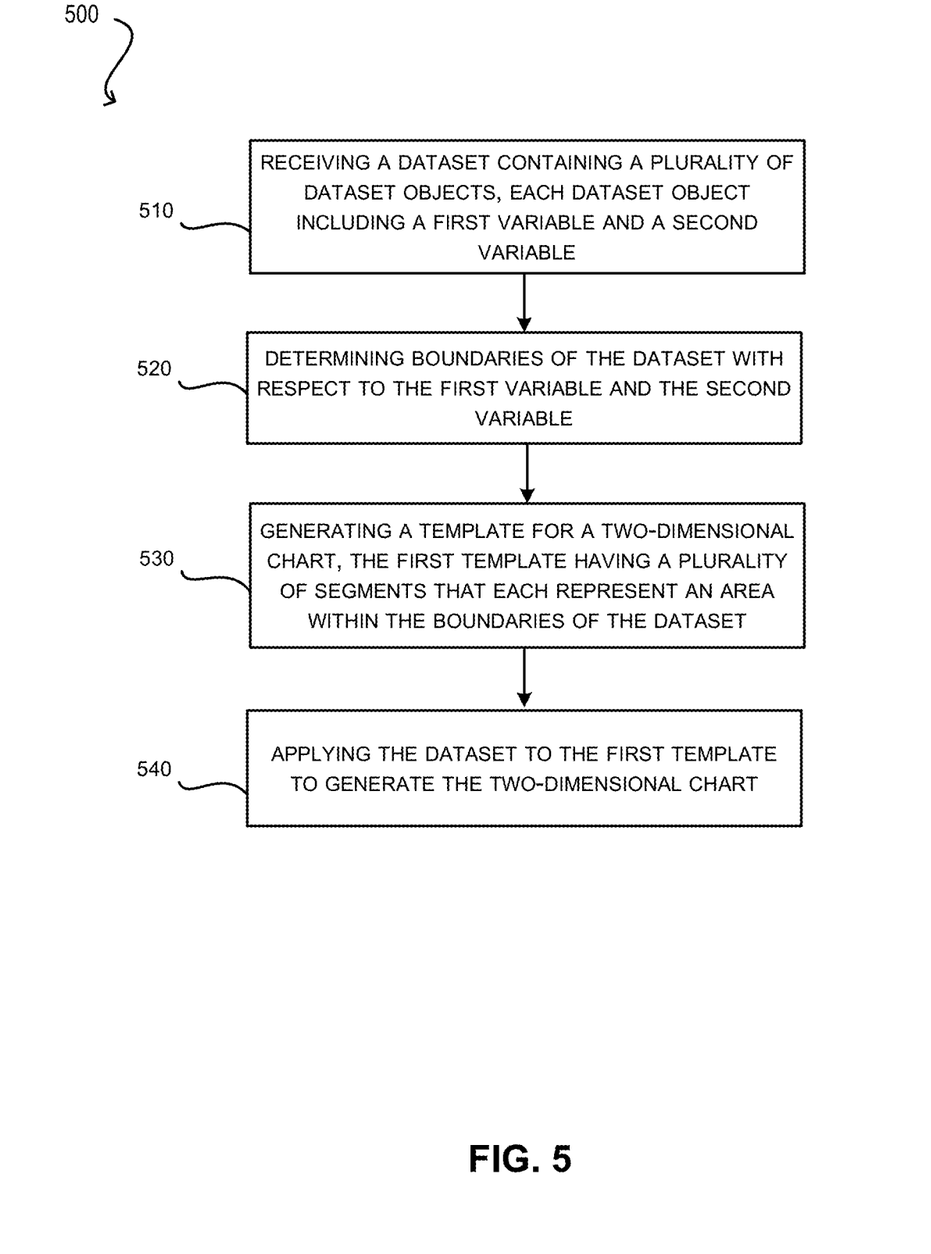
FIG. 5 illustrates a process flow for generating a package according to one embodiment.

FIG. 5 illustrates a process flow for generating a two-dimensional chart according to one embodiment. Process 500 can be stored in computer readable medium and executed by a processor. In one embodiment, process 500 can be performed by chart processing engine 130 of FIG. 1. Process 500 begins by receiving a dataset containing a plurality of dataset objects, each dataset object including a first variable and a second variable at step 510. Each dataset object can have values for the first variable and the second variable. At step 520, process 500 can continue by determining the boundaries of the dataset with respect to the first variable and the second variable. In one example, the boundaries of the dataset can be provided by the user. In another example, the boundaries of the dataset can be automatically determined by analyzing the dataset. Once the boundaries have been determined, process 500 can continue by generating a template for a two-dimensional chart at 530. The template can include segments that define the two-dimensional chart. Each segment can cover an area of the two-dimensional chart. The segments can be non-overlapping. In another example, the segments in combination can cover the boundaries of the dataset. For instance if the boundaries have a lower left hand corner of [0, 0] and an upper right hand corner of [100, 100], then the segments of the template would cover the entire area from [0, 0] to [100, 100]. In one example, the number of segments that exist in the template can be predefined and the position and size of each segment can be determined at runtime.

Once the template is generated, process 500 can continue by applying the dataset to the template to generate the two-dimensional chart at 540. Applying the dataset can include processing each segment in the template. For each segment in the template, process 500 can identify the dataset objects from the dataset that are located within the segment. In one example, process 500 can query the dataset for dataset objects that have a value for a first variable that is within a range specified by the segment and a value for a second variable that is within a range specified by the segment. Identified dataset objects, when plotted within the two-dimensional chart, would appear within the boundaries of the segment. Once the dataset objects have been identified, process 500 can shade the segment a color from a color scale when the total number of the dataset objects is greater than a predefined threshold. In one example, the shade can be based on the number of dataset objects that would appear within the boundaries of the segment. Each color in the color scale can correspond with a range of the total number of dataset objects. For instance if the total number of dataset objects is between 5-10, then a first color can be applied. If the total number of dataset objects is between 11-15, then a second color can be applied.

Instead of shading, process 500 can also plot the identified dataset objects when the total count of the plurality of dataset objects is less than or equal to the predefined threshold. As a result, some of the segments can be shaded a color from the color scale while other segments can include plotted dataset objects. In an alternate embodiment, the process can present all the segments as a color from the color scale. Segments containing a total number of dataset objects that are within a range can be converted by removing the shade and plotting the dataset objects.

Figure 6:
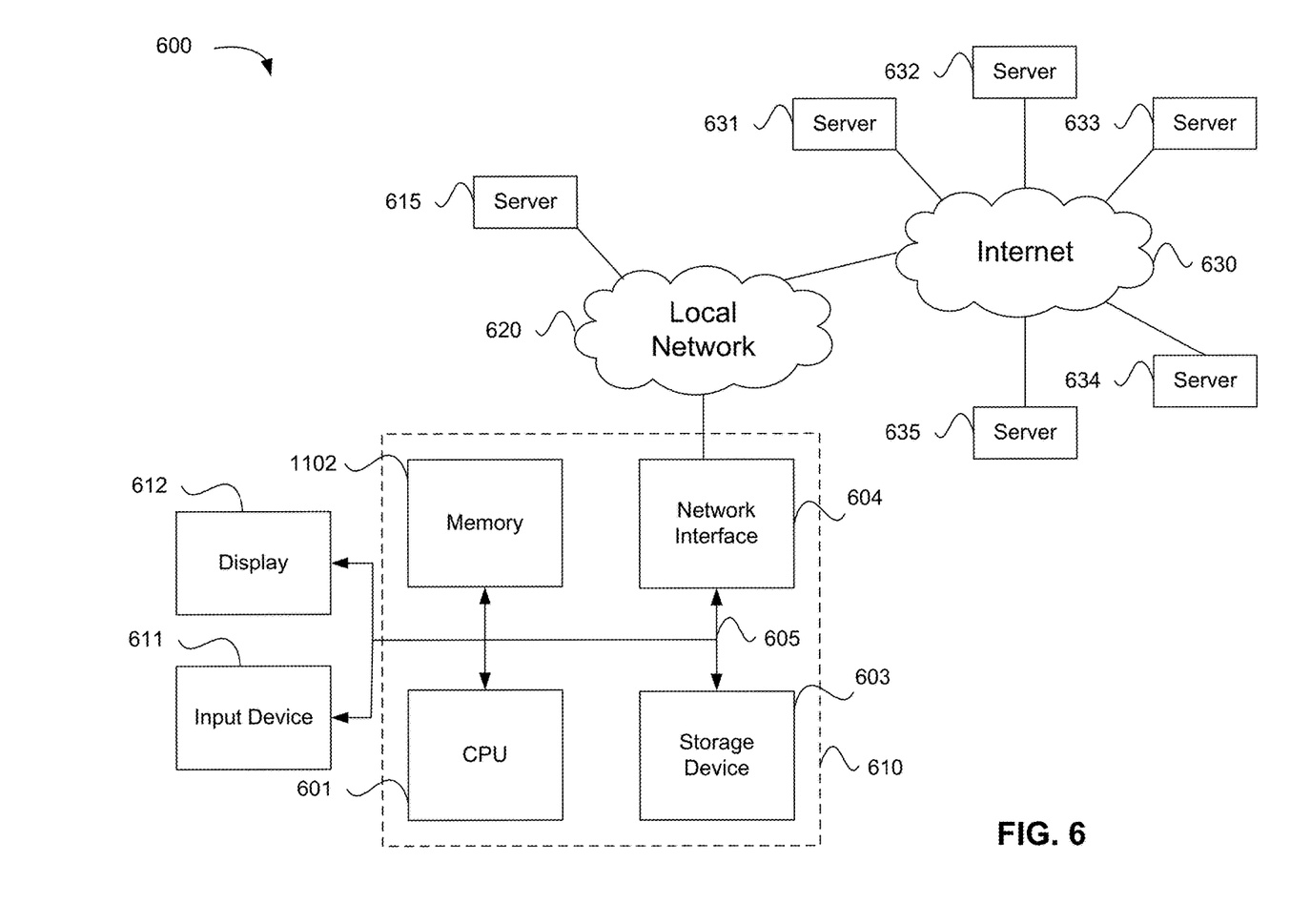
FIG. 6 illustrates an exemplary computer system according to one embodiment.

An exemplary computer system 600 is illustrated in FIG. 6. Computer system 610 includes bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example.

A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, by a server processor in response to a request from a client a dataset containing a plurality of dataset objects, each dataset object including a first variable and a second variable;
    determining, by the processor, boundaries of the dataset with respect to the first variable and the second variable;
    generating, by the processor, a first template for a coarse two-dimensional chart according to the boundaries of the dataset, the first template having a plurality of segments that each represent an area within the boundaries, wherein the first variable is associated with a first dimension of the coarse two-dimensional chart and the second variable is associated with a second dimension of the coarse two-dimensional chart;
    applying, by the processor, the dataset to the first template to generate the coarse two-dimensional chart, wherein applying the dataset comprises:
    determining a count of dataset objects from the dataset that are located within each of the plurality of segments of the first template;
    comparing the count of dataset objects in the segments of the first template with a threshold;
    generating a histogram layer for the first template comprising displaying an indication of the count of the dataset objects in the segments when the count is greater than the threshold; and
    generating a scatterplot layer for the first template comprising plotting the dataset objects as data points in a scatter plot in the segments when the count is less than the threshold;
    overlapping the scatterplot layer and the histogram layer to form the coarse two-dimensional chart such that all of the data points of the scatterplot layer appear within the histogram layer;
    presenting the coarse two dimensional chart with the plurality of segments;
    while the coarse two dimensional chart is being presented, the processor automatically generating in a background, a second template for a refined version of the two dimensional chart that shares the same boundaries as the first template, the second template having another plurality of segments which are smaller in area than the plurality of segments;
    applying, by the processor, the dataset to the second template to generate the refined version of the two-dimensional chart;
    replacing, by the processor, the coarse two-dimensional chart with the refined version of the two-dimensional chart, with the another plurality of segments bordered by first lines of a first line weight, wherein the another plurality of segments comprise a grid of squares;
    selecting in the refined version of the two-dimensional chart, a first range along the first dimension, the first range indicated by a second line weight different from the first line weight;
    selecting in the refined version of the two-dimensional chart, a second range along the second dimension, the second range indicated by the second line weight;
    based upon the selecting, enhancing resolution within an area of the refined version of the two-dimensional chart, wherein the area is a rectangle defined between the first range and the second range; and
    displaying a count of dataset objects from the dataset that are located within the area.

2. The computer-implemented method of claim 1, wherein the indication of the count of the dataset objects within the segment comprises shading the segment as a color from a color scale on the histogram layer of the two-dimensional chart.

3. The computer-implemented method of claim 2, wherein the color is determined by the number of dataset objects.

4. The computer-implemented method of claim 1, wherein the scatterplot layer is configured to allow for user interaction with the plotted dataset objects.

5. The computer-implemented method of claim 1, further comprising:
    detecting, by the processor, user input representative of zooming into a portion of the refined two-dimensional chart;
    generating, by the processor, a third template for the two-dimensional chart according to the portion, wherein the plurality of segments have been resized according to the boundaries of zoomed portion; and
    applying, by the processor, the dataset to the template to generate a further refined view of the two dimensional chart.

6. The computer-implemented method of claim 1 further comprising:
    determining a change in the count of dataset objects within a segment of the first template; and
    dynamically reassigning the segment to one of the histogram layer or the scatterplot layer based on the change in the count of dataset objects.

7. The computer-implemented method of claim 1 wherein the count is accompanied by a unique identifier that identifies the segment based on its position relative to other segments in the two-dimensional chart.

8. The computer-implemented method of claim 1 further comprising displaying a progress bar indicating a percentage of resolution displayed relative to a desired resolution.

9. The computer-implemented method of claim 1 wherein the first line weight is broken, and the second line weight is unbroken.

10. A non-transitory computer readable storage medium storing one or more programs, the one or more programs comprising instructions resulting in a processor of a server:
    receiving in response to a request from a client, a dataset containing a plurality of dataset objects, each dataset object including a first variable and a second variable;
    determining boundaries of the dataset with respect to the first variable and the second variable;

generating a first template for a coarse two-dimensional chart according to the boundaries of the dataset, the first template having a plurality of segments that each represent an area within the boundaries, wherein the first variable is associated with a first dimension of the coarse two-dimensional chart and the second variable is associated with a second dimension of the coarse two-dimensional chart;

applying the dataset to the first template to generate the coarse two-dimensional chart, wherein applying the dataset comprises determining a count of dataset objects from the dataset that are located within each of the plurality of segments of the first template;

comparing the count of dataset objects in the segments of the first template with a threshold;

generating a histogram layer for the first template comprising displaying an indication of the count of the dataset objects in the segments when the count is greater than the threshold;

generating a scatterplot layer for the first template comprising plotting the dataset objects as data points in a scatter plot in the segments when the count is less than the threshold;

overlapping the scatterplot layer and the histogram layer to form the coarse two-dimensional chart such that all of the data points of the scatterplot layer appear within the histogram layer;

presenting the coarse two dimensional chart with the plurality of segments;

while the coarse two dimensional chart is being presented, automatically generating in a background, a second template for a refined version of the two dimensional chart that shares the same boundaries as the first template, the second template having another plurality of segments which are smaller in area than the plurality of segments;

applying the dataset to the second template to generate the refined version of the two-dimensional chart;

replacing the coarse two-dimensional chart with the refined version of the two-dimensional chart, with the another plurality of segments bordered by first lines of a first line weight, wherein the another plurality of segments comprise a grid of squares;

selecting in the refined version of the two-dimensional chart, a first range along the first dimension, the first range indicated by a second line weight different from the first line weight;

selecting in the refined version of the two-dimensional chart, a second range along the second dimension, the second range indicated by the second line weight;

based upon the selecting, enhancing resolution within an area of the refined version of the two-dimensional chart, wherein the area is a rectangle defined between the first range and the second range; and displaying a count of dataset objects from the dataset that are located within the area.

11. The non-transitory computer readable storage medium of claim 10, wherein the indication of the count of the dataset objects within the segment comprises shading the segment as a color from a color scale on the histogram layer of the two-dimensional chart.

12. The non-transitory computer readable storage medium of claim 11, wherein the color is determined by the number of dataset objects.

13. The non-transitory computer readable storage medium of claim 10, further comprising:

detecting user input representative of zooming into a portion of the refined two-dimensional chart;

generating a third template for the two-dimensional chart according to the portion, wherein the plurality of segments have been resized according to the boundaries of zoomed portion; and applying the dataset to the third template to generate a further refined view of the two dimensional chart.

14. The non-transitory computer readable storage medium of claim 10 wherein the first line weight is broken, and the second line weight is unbroken.

15. A computer implemented system, comprising:

one or more computer processors located in a server; and a non-transitory computer-readable storage medium comprising instructions, which when executed, control the one or more computer processors to be configured for:

receiving in response to a request from a client a dataset containing a plurality of dataset objects, each dataset object including a first variable and a second variable;

determining boundaries of the dataset with respect to the first variable and the second variable;

generating a first template for a coarse two-dimensional chart according to the boundaries of the dataset, the first template having a plurality of segments that each represent an area within the boundaries, wherein the first variable is associated with a first dimension of the two-dimensional chart and the second variable is associated with a second dimension of the two-dimensional chart;

applying the dataset to the first template to generate the coarse two-dimensional chart, wherein applying the dataset comprises determining a count of dataset objects from the dataset that are located within each of the plurality of segments of the first template;

comparing the count of dataset objects in the segments of the first template with a threshold;

generating a histogram layer for the first template comprising displaying an indication of the count of the dataset objects in the segments when the count is greater than the threshold;

generating a scatterplot layer for the first template comprising plotting the dataset objects as data points in a scatter plot in the segments when the count is less than the threshold;

overlapping the scatterplot layer and the histogram layer to form the coarse two-dimensional chart such that all of the data points of the scatterplot layer appear within the histogram layer;

presenting the coarse two dimensional chart with the plurality of segments;

while the coarse two dimensional chart is being presented, automatically generating in a background, a second template for a refined version of the two dimensional chart that shares the same boundaries as the first template, the second template having another plurality of segments which are smaller in area than the plurality of segments;

applying the dataset to the second template to generate the refined version of the two-dimensional chart;

replacing the coarse two-dimensional chart with the refined version of the two-dimensional chart, with the another plurality of segments bordered by first lines of a first line weight, wherein the another plurality of segments comprise a grid of squares;

selecting in the refined version of the two-dimensional chart, a first range along the first dimension, the first range indicated by a second line weight different from the first line weight;

selecting in the refined version of the two-dimensional chart, a second range along the second dimension, the second range indicated by the second line weight;

based upon the selecting, enhancing resolution within a portion of a segment of the refined version of the two-dimensional chart, wherein the area is a rectangle defined between the first range and the second range; and displaying a count of dataset objects from the dataset that are located within the area.

16. The computer implemented system of claim 15, wherein the indication of the count of the dataset objects within the segment comprises shading the segment as a color from a color scale on the histogram layer of the two-dimensional chart.

17. The computer implemented system of claim 15, wherein the scatterplot layer is configured to allow for user interaction with the plotted dataset objects.

18. The computer implemented system of claim 15, further comprising:

detecting user input representative of zooming into a portion of the refined two-dimensional chart;

generating a third template for the two-dimensional chart according to the portion, wherein the plurality of segments have been resized according to the boundaries of zoomed portion; and applying the dataset to the third template to generate a further refined view of the two dimensional chart.

19. The computer implemented system of claim 15 wherein the first line weight is broken, and the second line weight is unbroken.

* * * * *